Jan. 9, 1934.                C. E. BITTAKER                1,942,797
            METHOD OF PREPARING TIRE CASINGS FOR VULCANIZATION
                    Filed Oct. 22, 1931        2 Sheets-Sheet 1

INVENTOR
Charles E. Bittaker
BY
Evans & McCoy
ATTORNEYS

Jan. 9, 1934.  C. E. BITTAKER  1,942,797
METHOD OF PREPARING TIRE CASINGS FOR VULCANIZATION
Filed Oct. 22, 1931  2 Sheets-Sheet 2

INVENTOR
Charles E. Bittaker
BY
Evans & McCoy
ATTORNEYS

Patented Jan. 9, 1934

1,942,797

UNITED STATES PATENT OFFICE 1,942,797

METHOD OF PREPARING TIRE CASINGS FOR VULCANIZATION

Charles E. Bittaker, Akron, Ohio, assignor to The General Tire & Rubber Company, Akron, Ohio, a corporation of Ohio Application October 22, 1931. Serial No. 570,329

5 Claims. (Cl. 18—56)

This invention relates to the art of building tires, and particularly to a new and improved method of preparing pneumatic tire casings for vulcanization.

One of the objects of the present invention is to provide a new and improved method of preparing tire casings for vulcanization wherein many of the conventional casing forming steps are eliminated.

Another object is to provide a method of preparing pneumatic tire casings for vulcanization wherein the use of conventional air bags is eliminated.

Another object is to provide a new, improved and economical method of forming drum built tire casings to shape for vulcanization.

A further object is to provide a simple method wherein drum built tire casings are formed to shape without the use of preliminary shaping means, such as suction boxes, and wherein the casing may be vulcanized without the use of conventional air bags.

With the above and other objects in view which will be apparent from the following detailed description, the present invention consists in certain features of construction and combinations of parts which will be readily understood by those skilled in the art to which the invention appertains.

In the drawings which illustrate the various steps in the method of preparing a tire casing for vulcanization, Figure 1 is a side elevation partially in section of a completed tire casing to be formed in accordance with the present invention;

One of the conventional methods of building pneumatic tire casings is to build up an annular band on a tire building drum, then to force the band to the shape of the completed tire casing in such apparatus as a vacuum box, and lastly to insert an air bag within the shaped tire casing and inflate the air bag while the casing is mounted in a mold for vulcanization purposes. In such cases it is conventional practice and essential to employ an air bag to hold the casing to shape while it is being placed in the mold sections and to hold the casing in such shape during the vulcanizing operation. Considerable time is consumed in carrying out these various steps and furthermore it is necessary to maintain a large supply of costly air bags in stock.

In constructing tire casings in accordance with the present invention, the heretofore mentioned intermediate step of pre-shaping the tire casing and the employment of air bags is eliminated, resulting in the manufacture of tire casings at less cost and in less time and with a material saving in labor.

Referring to the accompanying drawings in which like numerals refer to like parts throughout the several views, the tire casing 1 after it is removed from the tire building drum is in the shape of an annular band 2 having the tire beads 3 and tread 4 applied thereto.

Figure 1:
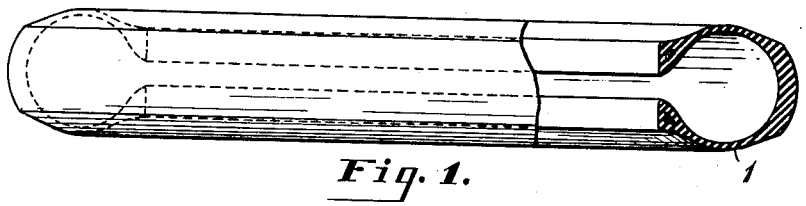
Figure 2:
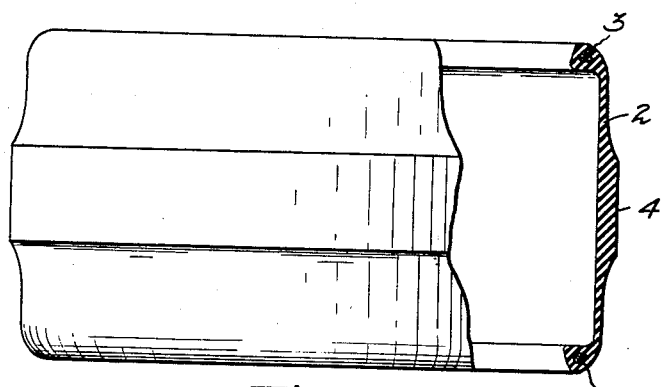
Fig. 2 is a side elevation of the tire band which has been constructed on a conventional tire building drum.
Figure 3:
Fig. 3 is a side elevation partially in section of a sealing ring used in the method of the present invention.
Figure 5:
Fig. 5 is an enlarged section taken substantially on the line 5—5 of Fig. 3 showing the sealing ring in detail.

As previously described, the method of the present invention is practiced without the use of the conventional air bag. It is proposed to use in their stead inexpensive sealing or vulcanizing rings, one type of which is shown in Figs. 3 and 5.

This vulcanizing ring comprises an endless member 5 of axially resilient stock having a pair of base portions 6 rigidly reinforced by inextensible rings of wire such as bead wire or any other suitable material, to maintain the desired shapes of the base portions. The base portions are integrally connected through an arched portion 8 of compressible resilient material, so that the base portions may be moved toward each other and clamped in position during the vulcanizing operation. Each base portion 6 is further formed at its outer marginal edge with an outwardly flaring flange 9 of resilient and pliable material such as soft rubber stock that will engage the inner walls of the tire casing in the regions of the tire beads, so that these portions, together with the abutting base portions 6, will form an effective and adequate air seal across the bead portions of the tire casing being vulcanized. The sealing ring described replaces the conventional costly air bag and is more economical to use in that it is not necessary to replace the same after continued use.

Furthermore, the sealing ring can be very easily and quickly placed in position in comparison to the conventional air bag which is very difficult to insert in tire casings, and particularly in those of large size such as truck tires.

It is obvious, however, that sealing rings other than the type illustrated may be employed. In another form, the base portions may be merely connected together by a central compressible portion in lieu of the arched portion described.

Sealing rings of the character described are very efficient in their operation and when in use during the vulcanizing operation the outer lateral edges of the base portions 6 thereof closely abut the tops of the tire beads and the outwardly flaring flanges 9 thereof closely fit the inner side walls of the tire casing. The base portions are rigidly clamped between the tire beads by means of the tire beads themselves against the resistance of the resilient central arched portion of the sealing ring, and the resilient flanges 9 are forced against the side walls of the tire casing as a result of the air pressure that is maintained within the casing during the vulcanizing period.

The vulcanizing mold is of conventional type, comprising a pair of mating sections 10 and 11 each having a mold cavity 12 therein which, when combined with the corresponding cavity, correspond to the shape of the completed tire casing. The mold sections illustrated in the drawings are of the type which are arranged to be clamped together and placed in a vulcanizing pot or other suitable heater. It is obvious, however, that other types of mold sections may be employed. These mold sections furthermore are closed in at 13 inwardly of the cavity 12 therein for a purpose to be later described.

Figure 4:
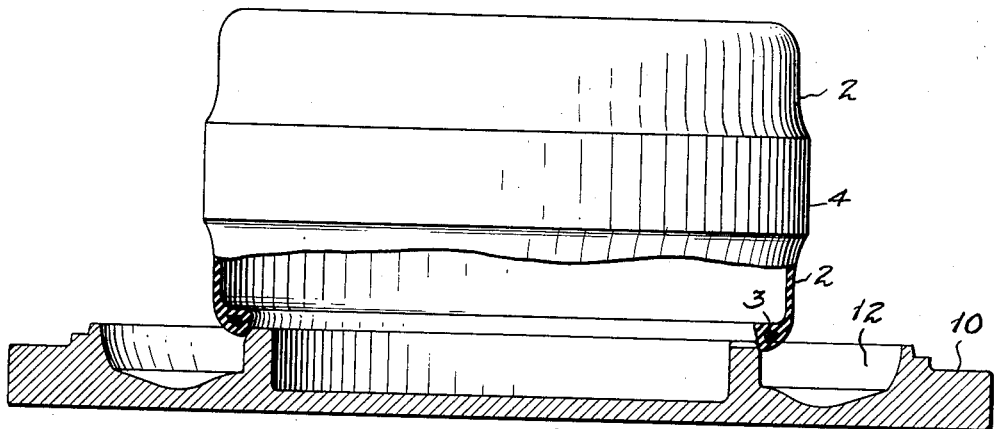
Fig. 4 is a section through one of the sections of a tire vulcanizing mold showing the first step of the method wherein the drum built band is placed on the mold section.

In practicing the method of the present invention the tire casing band 2 is placed in a horizontal position with the lowermost tire bead 3 seated against an inclined face formed at the inner periphery of the tire cavity 12 substantially as shown in Fig. 4.

Figure 6:
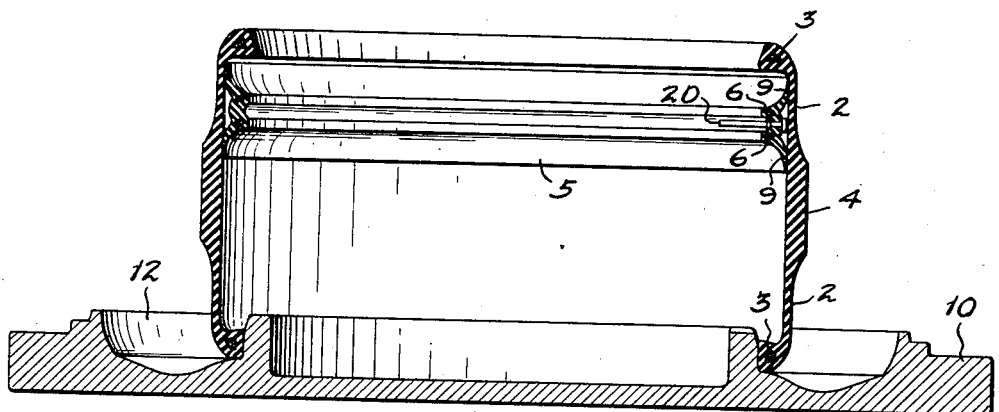
Fig. 6 is a section similar to Fig. 4 showing the lower tire bead in partially seated position in the mold cavity, and showing the sealing ring in its initial position.

The sealing ring 5 is next positioned within the casing band 2 near the uppermost tire bead, as shown in Fig. 6. In this position the arched portion 8 is slightly circumferentially compressed and engages the band with the flaring flanges 9 moved out of their true positions to a distorted position to such an extent that they seal the sealing ring in place within the tire casing band.

Figure 7:
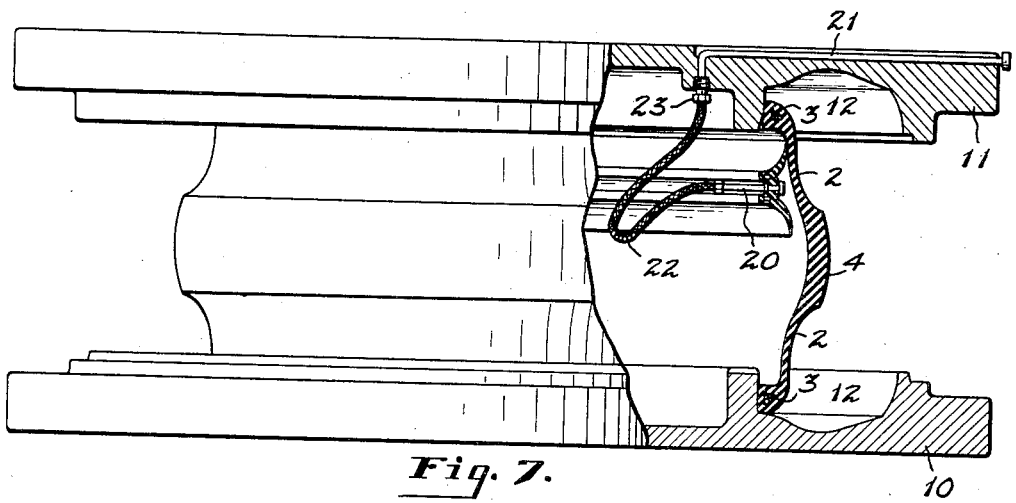
Fig. 7 is a section similar to Fig. 6 showing the other mold section mounted on the tire band and partially lowered toward the other mold section.
Figure 8:
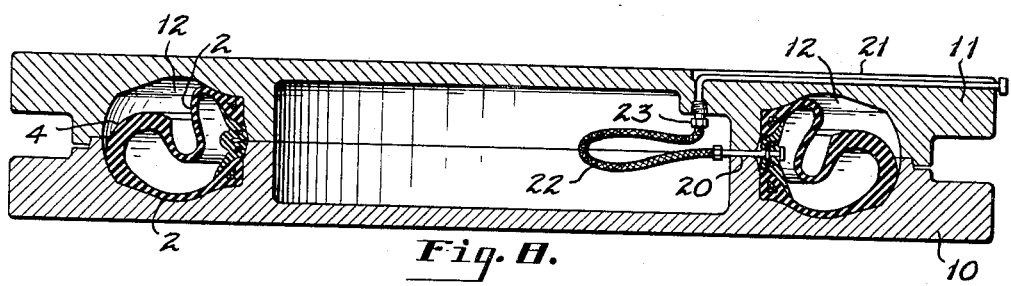
Fig. 8 is a section through the mold sections showing the same in their lowered cooperating position and showing the distorted shape of the tire casing therein prior to the inflation of the casing for vulcanization.

The upper mold section 11 is then lowered, as shown in Fig. 7, so that the uppermost tire bead 3 engages an inclined face formed at the inner periphery of the mold cavity 12 and the upper section is then gradually lowered toward the lower mold section which causes the tire beads to seat within the bead seating portions of the cavity, as shown in Fig. 7. As the mold sections 10 and 11 are brought into engagement with each other, as shown in Fig. 8, the space inwardly of the tire casing band 2 is sealed by reason of the continuous contact between the beads 3 and the bead walls of the mold sections, and provides an air chamber therebetween. The upper mold section is gradually lowered toward the lower section during which time they are very accurately guided by any suitable arrangement, such as guide pins, to prevent twisting of the casing. Furthermore, after the upper mold section is lowered the air confined within the band is compressed and this, together with the weight of the upper mold sections, causes the band 2 to distort radially outwardly and gradually assume a doubled shape such as that shown in Fig. 8.

The sealing ring 5 gradually moves downwardly during the lowering of the upper mold section, and after the band distorts and the mold sections approach their closed position the flaring flanges flex outwardly and the base portions are clamped firmly between the toes of the tire beads 3, thereby compressing the arched portion of the sealing ring and thereby providing an airtight seal between the sealing ring and the tire beads.

The mold sections as they are brought into mating relationship are securely clamped together and then compressed air is admitted through an air valve 20 carried by the sealing ring into the casing to expand the casing to its desired shape within the mold cavity and to hold the casing in its proper shape during the vulcanizing process. Several mold units may be placed in a suitable pot heater so that several casings may be vulcanized at the same time. Since the portions of the mold sections inwardly of the cavities 12 are sealed, the upper mold section is formed with an air inlet conduit 21 having a flexible tube 22 in communication therewith inwardly of the mold cavity. Before the upper section is molded into contact with the upper tire bead this tube 22 is connected with the air valve 21 by means of a suitable coupling 23.

The advantages of the method described are readily apparent. Vacuum boxes and other devices used in preforming the drum built band to shape and the labor incident thereto are eliminated. Furthermore, the equipment for inserting the air bags in the tire casings and the labor incident thereto are eliminated. The elimination of these items and labor greatly reduces the time and labor in preparing the tire casings for vulcanization, which obviously results in a more economical production of tire casings. A further saving in time and equipment is effected by the use of sealing rings instead of conventional air bags. The sealing rings are less costly and the air bags are of such construction that they need not be replaced in service as often as air bags, which eliminates the necessity of maintaining an unusually large stock on hand.

Furthermore, the method described is very simple to practice and does not require unusually skilled labor and the use of costly equipment.

Furthermore, it is to be understood that the particular procedure set forth is presented for purposes of explanation and illustration and that various modifications of said procedure can be made without departing from my invention as defined in the appended claims.

What I claim is:

1. The method of preparing drum built pneumatic tire casings for vulcanization, which consists in positioning an annular sealing ring within and in abutting relation against the inner periphery of a drum built tire casing band, positioning said band between a pair of mating mold sections radially inwardly of and coaxial with the mold cavities of said sections, moving said sections toward each other to clamp said sealing ring between the beads of said tire casing band and from an air-tight seal, and subsequently pneumatically expanding said band into its substantially final shape within the mating molding cavities of said sections.

2. The method of preparing drum built pneumatic tire casings for vulcanization, which consists in positioning an axially compressible annular sealing ring within and coaxial with a drum built tire casing band, positioning said band between a pair of mating mold sections with the bead cavities of the sections in sealed engagement with the bead portions of said band, moving said sections into abutting relation thereby axially compressing said sealing ring between said bead portions to provide an air-tight seal, maintaining said air-tight seal and pneumatically expanding said band into its substantially final tire casing shape within the mating vulcanizing cavities of said sections.

3. The method of preparing drum built pneumatic tire casings for vulcanization, which consists in positioning an axially compressible annular sealing ring within a drum built tire casing band, positioning said band between a pair of mating mold sections with the bead cavities of the sections in sealed engagement with the bead portions of said band, maintaining an air-tight air chamber between said mold sections radially inwardly of said band, moving said mold sections toward each other whereby the air compressed therebetween may assist in moving the portion of the band between its bead portions outwardly of said bead portions, abutting the mold sections against each other to axially compress said sealing ring between said bead portions and provide a seal therebetween, and subsequently pneumatically expanding the band into its substantially final tire casing shape.

4. The method of preparing drum built pneumatic tire casings for vulcanization, which consists in positioning one bead of a drum built band member in the bead cavity of a mold section, positioning an annular sealing ring within the band member, positioning a mold section on the band member with the bead cavity thereof in engagement with the other bead of said band member, moving said mold sections toward each other into mating and abutting relationship to distort the band member into its approximate final form in the mold cavities of said mold sections and to rigidly clamp said sealing ring between the beads of said member to provide an air-tight seal therebetween, and then admitting air into the space between said sealing ring and band member to expand said member into its final tire casing form within the mold cavities of said mold sections.

5. The method of preparing drum built pneumatic tire casings for vulcanization, which consists in positioning one bead of a drum built band in the bead cavity of a mold section, positioning an annular sealing ring against the inner periphery of said band, positioning a mold section on the band with the bead cavity thereof in engagement with the other bead of said band to provide a sealed air chamber within said band and between said mold sections, moving said mold sections toward each other to compress the air within said chamber, whereby said air during movement of said mold sections may move said band into its approximate final form within the mold cavities of said mold sections, abutting said mold sections against each other in mating relationship to rigidly clamp said sealing ring between the beads of said band, clamping said mold sections together, and admitting air into the space between said band and sealing ring to expand said band into its final tire casing form within the mold cavities of said mold sections.

CHARLES E. BITTAKER.